(12) United States Patent
Zecher et al.

(10) Patent No.: US 10,556,780 B2
(45) Date of Patent: Feb. 11, 2020

(54) AUTOMOTIVE SERVICE LIFT SYSTEM WITH VEHICLE POSITION DETECTION AND GUIDANCE

(71) Applicant: Hunter Engineering Company, St. Louis, MO (US)

(72) Inventors: Matthew John Zecher, St. Peters, MO (US); Michael Olsen, Lake St. Louis, MO (US); Nicholas J. Colarelli, III, Frontenac, MO (US)

(73) Assignee: Hunter Engineering Company, St. Louis, MO (US)

( * ) Notice: Subject to any disclaimer, the term of this patent is extended or adjusted under 35 U.S.C. 154(b) by 234 days.

(21) Appl. No.: 15/807,273

(22) Filed: Nov. 8, 2017

(65) Prior Publication Data
US 2018/0134529 A1    May 17, 2018

Related U.S. Application Data

(60) Provisional application No. 62/422,267, filed on Nov. 15, 2016.

(51) Int. Cl.
*B66F 7/28* (2006.01)
*G01B 11/275* (2006.01)

(52) U.S. Cl.
CPC .............. *B66F 7/28* (2013.01); *G01B 11/275* (2013.01); *G01B 11/2755* (2013.01); *B66F 2700/123* (2013.01); *G01B 2210/14* (2013.01)

(58) Field of Classification Search
CPC ........................................................ B66F 7/28

USPC ............................................. 33/286; 187/216
See application file for complete search history.

(56) References Cited

U.S. PATENT DOCUMENTS

| 2,979,694 | A | * | 4/1961 | Lamberti | B66F 7/18 340/932.2 |
|---|---|---|---|---|---|
| 3,509,527 | A | * | 4/1970 | Oakes | B66F 7/28 340/932.2 |
| 4,808,997 | A | * | 2/1989 | Barkley | G08G 1/04 250/491.1 |
| 5,285,205 | A | * | 2/1994 | White | B60Q 1/48 33/264 |
| 6,298,284 | B1 | * | 10/2001 | Burns, Jr. | G01B 11/275 356/139 |
| 7,308,971 | B2 | | 12/2007 | Liebetreu et al. | |
| 8,573,363 | B2 | | 11/2013 | Healy et al. | |

(Continued)

*Primary Examiner* — Christopher W Fulton
(74) *Attorney, Agent, or Firm* — Sandberg Phoenix & von Gontard, P.C.

(57) ABSTRACT

A vehicle position detection and guidance system for use with an automotive service lift having a pair of runways onto which a vehicle is driven in order to be elevated. The system consists of a LiDAR sensor disposed to provide a field of view encompassing a volume of space extending upward from the upper surface of each lift runway, as well as the intervening region between the runways. The LiDAR sensor to observes at least the leading tread surfaces of two or more wheels on a vehicle approaching the service lift, and a volume of space below the vehicle. Output from the LiDAR sensor is conveyed to a processing system, which monitors the wheel positions relative to the runway surfaces, and provides output indicating steering corrections, obstructions, and a vehicle stopping point as the vehicle is driven onto the runways and/or the lift elevation changes.

19 Claims, 6 Drawing Sheets

(56) References Cited

U.S. PATENT DOCUMENTS

| | | | |
|---|---|---|---|
| 9,021,707 B2* | 5/2015 | LeBlanc | G01C 15/004 |
| | | | 33/286 |
| 9,452,917 B2 | 9/2016 | Healy et al. | |
| 2004/0113815 A1* | 6/2004 | Newcomer | B62D 15/00 |
| | | | 340/932.2 |
| 2006/0279728 A1* | 12/2006 | Dorrance | G01B 11/2755 |
| | | | 356/139.03 |
| 2014/0076665 A1* | 3/2014 | Nussbaum | B66F 7/20 |
| | | | 187/203 |
| 2014/0259707 A1* | 9/2014 | Jones | G01S 7/4026 |
| | | | 33/228 |
| 2016/0116273 A1* | 4/2016 | Voeller | G01B 11/2755 |
| | | | 702/94 |
| 2016/0171892 A1* | 6/2016 | Gieseke | G08G 1/04 |
| | | | 348/148 |
| 2017/0096102 A1* | 4/2017 | Nallapa | B60Q 9/002 |

* cited by examiner

AUTOMOTIVE SERVICE LIFT SYSTEM WITH VEHICLE POSITION DETECTION AND GUIDANCE

CROSS-REFERENCE TO RELATED APPLICATIONS

The present application is related to, and claims priority from, U.S. Provisional Application Ser. No. 62/422,267 filed on Nov. 15, 2016, which is herein incorporated by reference.

STATEMENT REGARDING FEDERALLY SPONSORED RESEARCH

Not Applicable.

BACKGROUND OF THE INVENTION

The present application is related to automotive service lifts onto which a vehicle is driven in order to be elevated during a vehicle service procedure, such as a wheel alignment service, and in particular, to a vehicle position detection and guidance system configured to guide a vehicle moving onto the supporting runway surfaces of the automotive service lift, as well as to detect potential obstructions present in the path of either the vehicle or vertical movement of the lift itself.

Numerous vehicle service procedures require or benefit from elevating a vehicle undergoing a service to a convenient working height for a service technician. As such, it is common practice for the service technician to initially drive the vehicle onto an automotive service lift located within a service bay or vehicle inspection area. A typical automotive service lift consists of two parallel runways, onto which the wheels of the vehicle are driven. An approach end of the automotive service lift may include a set of inclined ramps over which the vehicle drives as it moves onto the runways, while the opposite end of the automotive service lift may include a set of stops or end plates to prevent the vehicle from being accidentally driven or rolled off the end of the runways. If the lift is installed in a floor recess, such that the runway surfaces are level with the surrounding floor in a lowered configuration, no approach ramps are required. Depending upon the particular configuration of the automotive service lift, movable surfaces such as turn plates and slip plates may be located on the runways between the approach end and the stops, such as shown in U.S. Pat. No. 7,308,971 to Liebetreu et al., which is herein incorporated by reference.

Driving a vehicle onto an automotive service lift requires that the vehicle be initially positioned with the wheels in-line with the lift runway surfaces, and that the approach path be maintained in a straight direction parallel to the service lift centerline as the vehicle moves onto the runways. Excessive steering of the vehicle, or initial misaligned of the wheels and runways can potentially result in the vehicle being driven off an edge of the runways. As the vehicle moves onto the lift runways, the driver's view of the runway surfaces is commonly obscured by the front of the vehicle, rendering it difficult to apply steering corrections or determine where to stop the vehicle. Failure to stop the vehicle at an appropriate location on the runways surfaces can either leave rear wheels of the vehicle off of the service lift, or can cause the front wheels to abut against the stops or end plates. For some vehicle service procedures, it is required that the vehicle be stopped at specific locations on the runways, and subsequently rolled either forward, backwards, or in both directions over a short distance. During the subsequent rolling, vehicle measurements are acquired, the suspension relaxed, and/or the vehicle positioned on a set of the movable surfaces.

Proper driving and positioning of the vehicle onto the lift runways either requires a second technician to provide guidance to the vehicle driver, or the use of a mirror or other visual guide located within the driver's field of view. Over time, a skilled technician is likely to develop an intuitive sense of where the vehicle front wheels are located, and approximately where to stop the vehicle, but due to differences in vehicle wheelbase dimensions, it remains difficult to determine where the rear wheels are relative to the runway surfaces or how close the wheels may be to an edge of the runway surfaces.

Absent a second technician observing the location of all four vehicle wheels and the lift runway surfaces, it is challenging for a service technician in the vehicle driver's seat to be fully aware of the vehicle wheel positions and any potential obstructions which may have been left on the lift runway surfaces during a prior service procedure. Mirrors and monitors, while useful, in maintaining the vehicle direction of travel, and providing a visual indication of where to stop the vehicle, generally do not enable adequate viewing of the lift runway surfaces under the vehicle, and therefore fail to provide a driver with any indication or warning of potential obstructions on the lift runway surfaces, such as wheel chocks or misplaced tools.

Accordingly, it would be beneficial to provide an automotive service lift with a vehicle position detection and guidance system capable of accurately monitoring the position of a vehicle approaching, departing, and/or disposed on the lift runways, so as to provide a service technician with any necessary steering and stopping guidance while positioning a vehicle on or off the service lift during a service or inspection procedure.

It would be further beneficial for the vehicle position detection and guidance system to observe not only the position of the vehicle wheels relative to the lift runway surfaces, but also to detect the presence of any obstructions to vehicle movement located on the lift runway surfaces, such as wheel stops, tools, jacks, or other items inadvertently left behind during a previous vehicle service or inspection procedure. Similarly, it would be beneficial for the vehicle position detection and guidance system to observe the spatial volume beneath both the vehicle and the automotive service lift (when elevated), to ensure that no obstacles are present which would interfere with either vehicle movement or changes in the lift elevation.

BRIEF SUMMARY OF THE INVENTION

Briefly stated, the present application sets forth a vehicle position detection and guidance system for use with an automotive service lift structure having a pair of parallel runways onto which a vehicle undergoing a service or inspection is driven and parked in order to be elevated to a service height. The vehicle position detection and guidance system consists of a LiDAR sensor disposed in proximity to the front end of the automotive service lift structure. The LiDAR sensor is configured with a generally horizontal field of view oriented towards the vehicle approach end of the service lift, encompassing a volume of space extending upward from the upper surface of each lift runway, as well as the intervening region between the runways. The LiDAR sensor is disposed such that the field of view enables the sensor to observe at least the leading tread surfaces of two or more wheels on a vehicle approaching the service lift, and preferably the leading tread surface of each wheel on the vehicle. Output signals from the LiDAR sensor are conveyed to a processing system, which monitors the wheel positions relative to the runway surfaces, and provides output to a service technician driving the vehicle indicating any required steering corrections and a vehicle stopping point as the vehicle is driven onto the runways.

In a further embodiment, the LiDAR sensor of the vehicle position detection and guidance system is configured to additionally observe the leading edge of the vehicle and the vehicle undercarriage surfaces as the vehicle approaches and is driven onto the automotive service lift runways. By evaluating the position of the vehicle leading edge and/or undercarriage surfaces observed by the LiDAR sensor, the processing system can detect if the vehicle will encounter any obstructions either on the lift runways or in the volume of space between the runway surfaces and provide a suitable warning to the driver. Such obstructions may include, but are not limited to, tools left on the runway surfaces, wheel chocks left on the runway surfaces, and jack components supported between the runway surfaces which are not properly stowed in a storage position. Similarly, if the approaching vehicle has low ground clearance body components, such as a front air splitter, side skirts, or a front air dam which will not clear a ramp located at the front of the lift runways, a warning signal can be provided to the driver prior to any potentially damaging impact.

In an additional embodiment, the LiDAR sensor of the vehicle position detection and guidance system is configured to observe the volume of space located beneath the vehicle and between the lift runways before and during any operation which alters the height of the automotive service lift structure. If obstructions, such as improperly stowed lift jacks, or even the presence of a service technician under the vehicle, are detected within the observed volume by the processing system, any lift movement can be prevented or immediately terminated, and a suitable warning provided.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
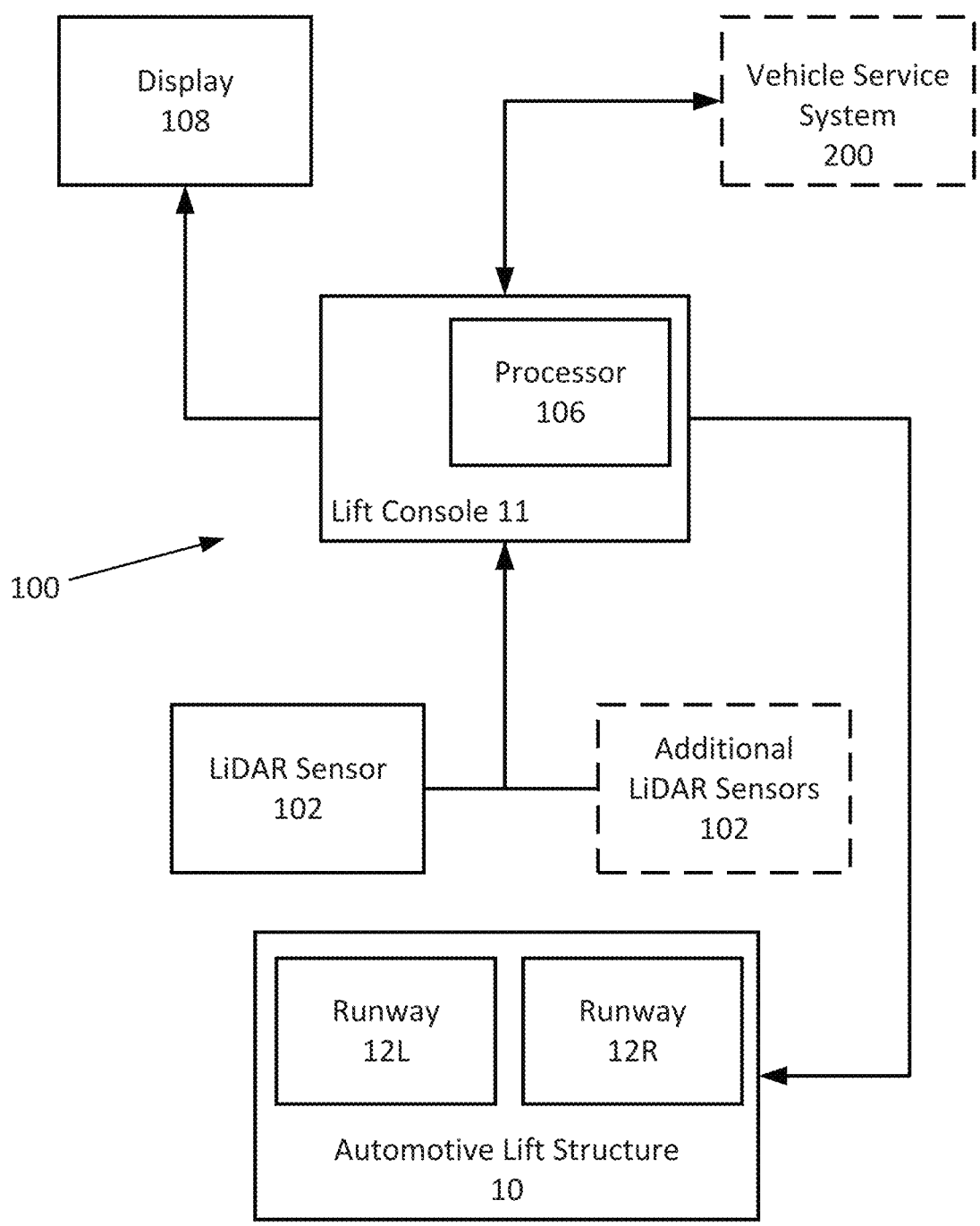
FIG. 1 is a block diagram illustrating the interaction between the sensor system components, the vehicle lift rack, and an optional vehicle service system.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figure 2:
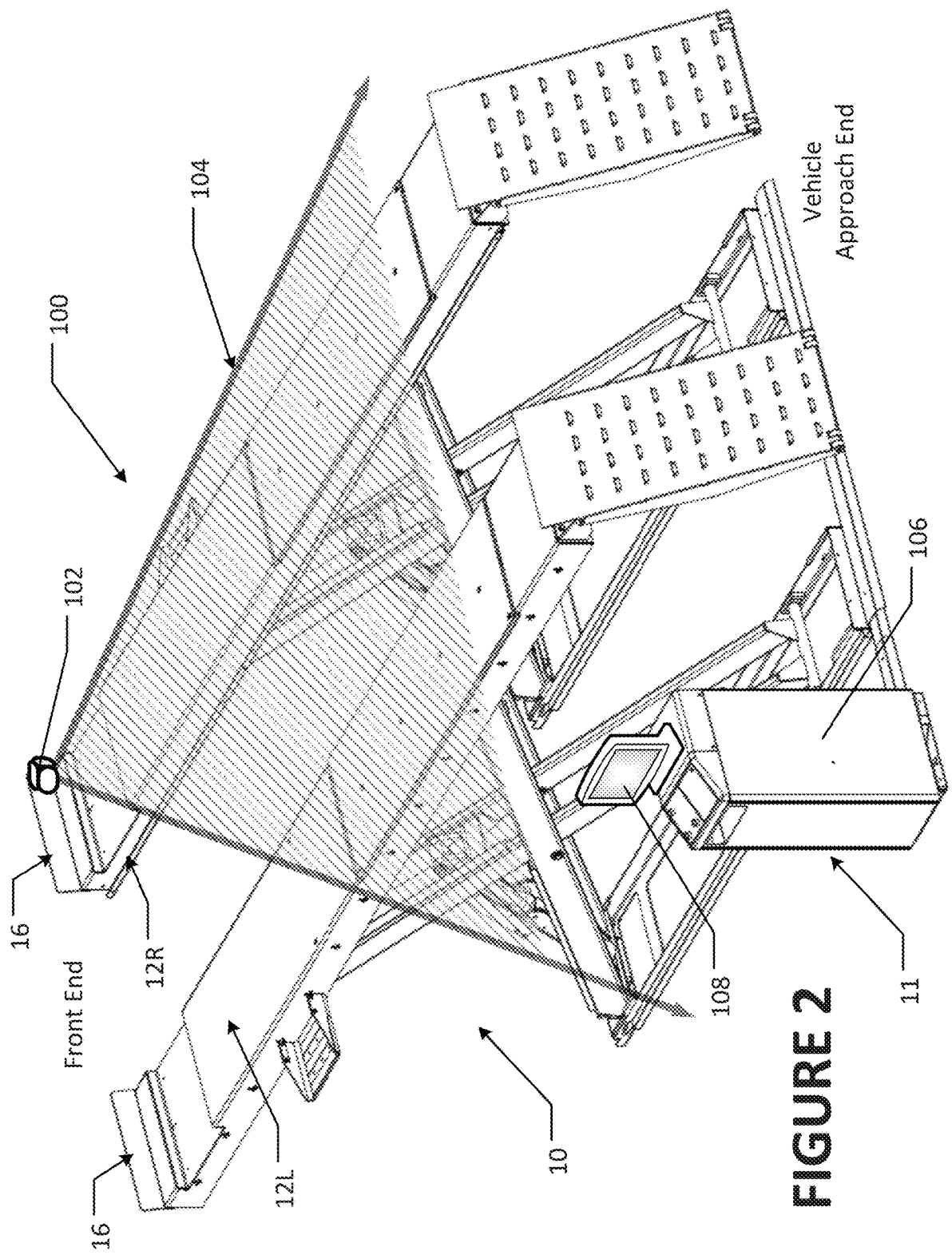
FIG. 2 is a perspective view of an elevated vehicle lift rack, with a sensor system of the present disclosure in an outboard position, illustrating a portion of the general field of view.
Figure 3:
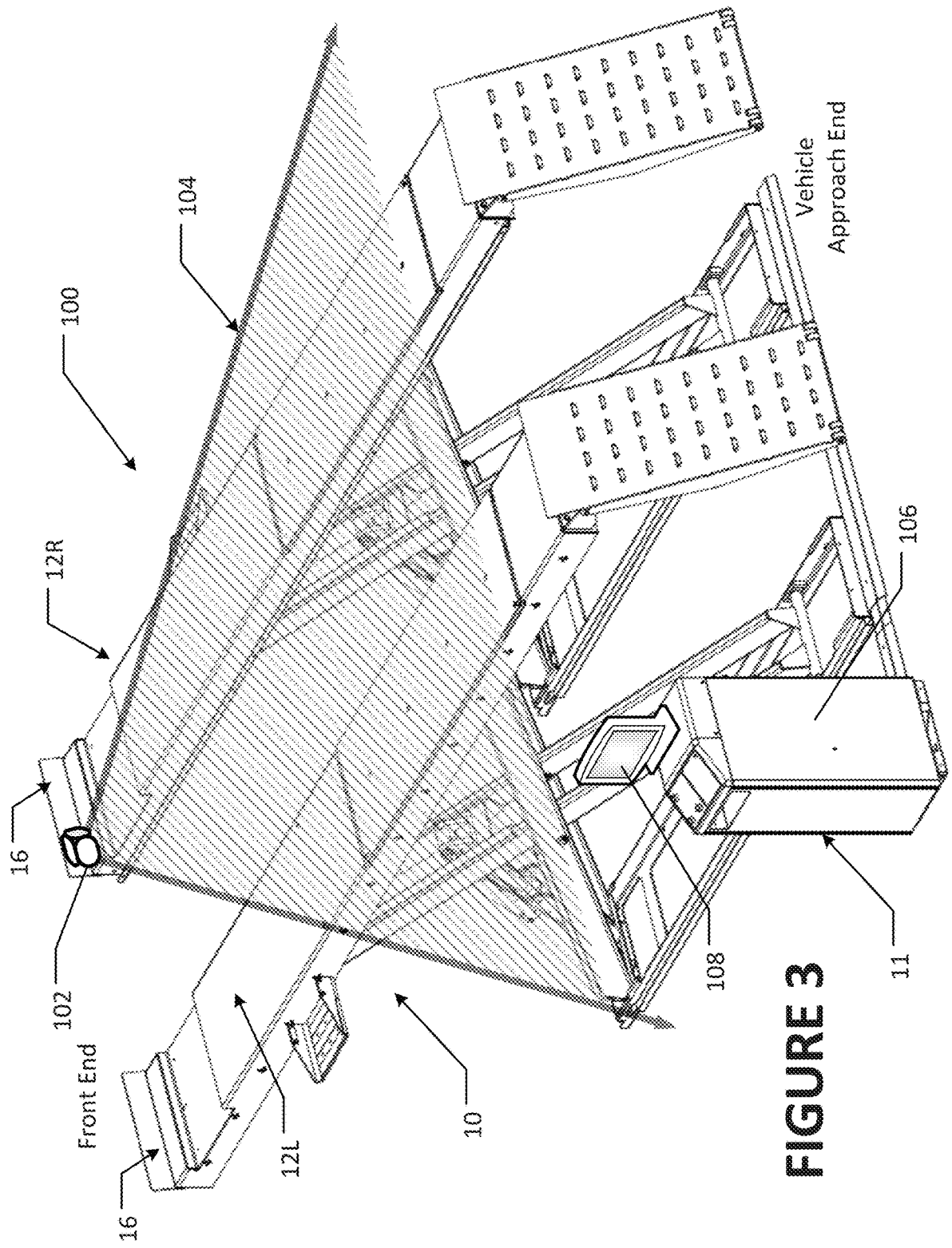
FIG. 3 is a perspective view of an elevated vehicle lift rack, with a sensor system of the present disclosure in an inboard position, illustrating a portion of the general field of view.
Figure 4:
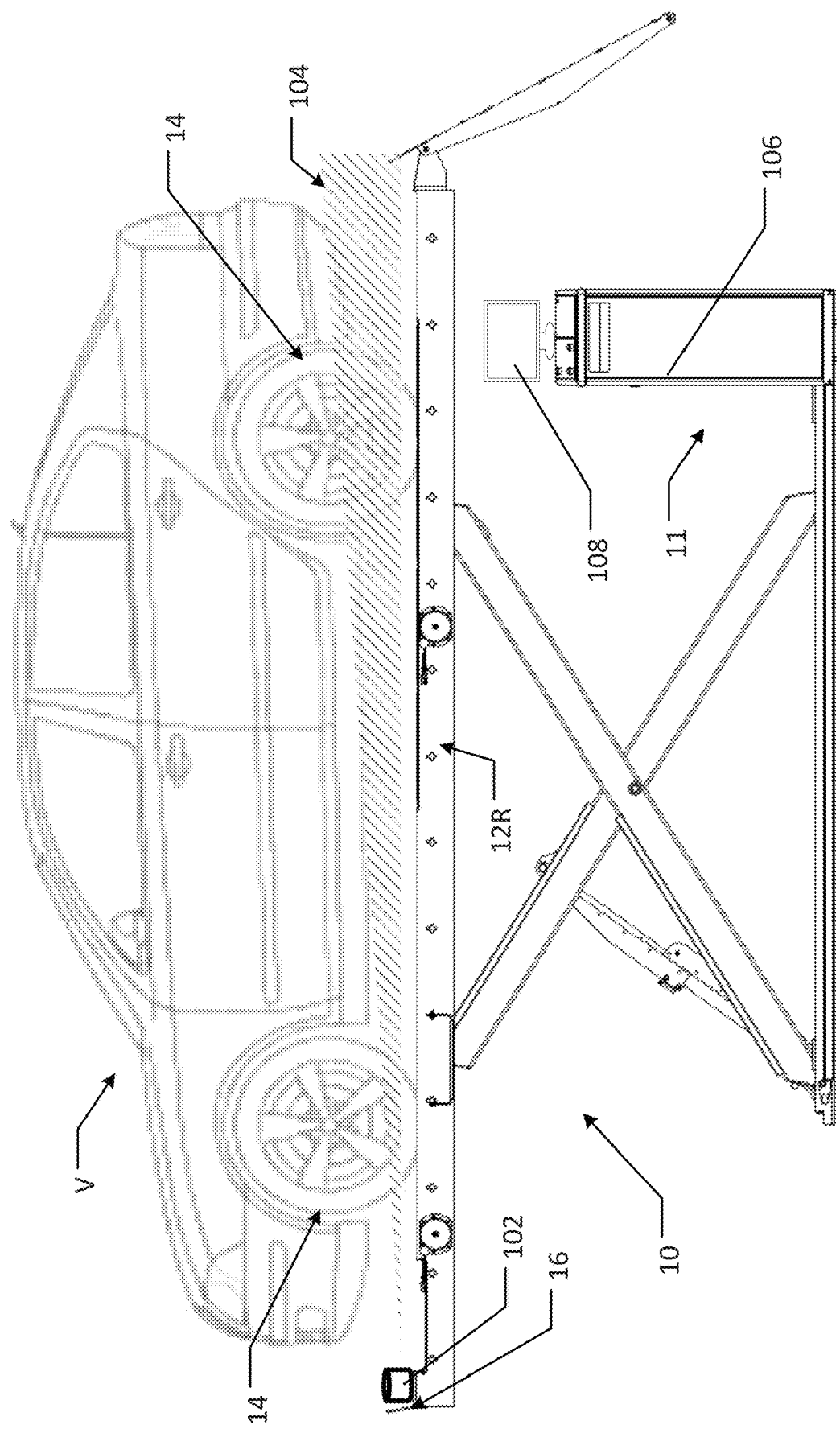
FIG. 4 is front perspective view of an elevated vehicle lift rack supporting a vehicle, illustrating how the general field of view for a sensor system shown in FIG. 3 intersects the vehicle wheels and the technician.

Turing to the figures, and to FIG. 1 in particular, an embodiment of the present disclosure is shown as a vehicle position detection and guidance system 100 for use with an automotive service lift structure 10 having a control console 11, and a pair of parallel runways 12L and 12R onto which a vehicle V undergoing a service or inspection is driven and parked in order to be elevated to a service height. The vehicle position detection and guidance system 100 consists of at least one LiDAR sensor 102 disposed in proximity to a front end of the automotive service lift structure 10, in either an outboard position as shown in FIG. 2, or an inboard position as shown in FIG. 3. An exemplary LiDAR sensor 102 is the M8 solid state LiDAR sensor manufactured by Quanergy Systems of Sunnyvale, Calif. The LiDAR sensor 102 is provided with a generally horizontal field of view, a portion of which is shown at 104, oriented from the front end of the service lift 10, towards the vehicle approach end of the service lift 10, encompassing a region of space extending above a portion of an upper surface of each lift runway 12L, 12R, as well as encompassing a portion of the intervening region between each of the runways. The field of view may be generally planar, oriented in a horizontal configuration, or encompass a three-dimensional volume of space, depending upon the design particulars of the LiDAR sensor 102. The LiDAR sensor 102 is preferably disposed on the lift structure 10 such that the field of view 104 enables the LiDAR sensor 102 to observe at least a segment across leading tread surfaces of two or more wheels 14 on the vehicle V approaching or present on the service lift 10, and preferably a segment across the leading tread surfaces of each wheel 14 on the vehicle V, such as seen generally in FIG. 4.

An exemplary location for the LiDAR sensor 102 is in proximity to a wheel stop plate 16 disposed at a front end of one of the lift runways 12L, 12R, however, it will be recognized that placement locations other than those shown in FIGS. 2 and 3 may be suitable for observing the vehicle wheels 14 and the surfaces of the runways 12L, 12R. For example, if a cross-beam structure is present between the lift runways 12L, 12R, locating the LiDAR sensor 102 on the cross-beam may provide a suitable field of view. Preferably, the LiDAR sensor 102 is positioned to move together with service lift 10, such that the field of view 104 remains fixed relative to the lift runways 12L, 12R at all times. Alternatively, the LiDAR sensor 102 may be positioned apart from, but in proximity to, the lift structure 10, so long as a suitable field of view encompassing the aforementioned surfaces is maintained.

During operation, the LiDAR sensor 102 illuminates the surfaces within the observable field of view 104, and generates a two- or three-dimensional map of those surfaces. Processing of the LiDAR sensor data to generate the two- or three-dimensional map may be carried out by appropriate logic circuits or processor configured with software instructions contained within the LiDAR sensor 102, or in a similarly configured remote processor or processing system 106 to which LiDAR sensor data is conveyed. The processing system 106, which may be contained within the lift rack console 11 as shown in FIG. 1, is configured with software instructions to evaluate the output signals in order to identify and monitor the positions of each observed vehicle wheel 14 relative to the runway surfaces 12L and/or 12R and/or relative to the position of the LiDAR sensors 102 (which are at known positions relative to the runway surfaces).

The processing system 106 is configured with software instructions to utilize the monitored positions in order to generate an output to a service technician driving the vehicle V, indicating any necessary steering corrections and/or a vehicle stopping point, as the vehicle V is driven onto the runway surfaces 12L and 12R towards a preferred or predetermined location required for a vehicle service or inspection procedure. The output may be representative of visual and/or audible guidance. For example, visual output provided on a monitor 108 observable by the service technician may include left and right arrows to indicate necessary steering corrections, as well as a STOP indicator. Audible guidance may include a warning signal when the vehicle has reached either a stopping position or is varying too far from an expected straight-line path on the runway surfaces 12L and 12R. Preferably, the vehicle position detection and guidance system 100 is continually active at all times during a vehicle service or inspection procedure, and acts as a safety feature during any vehicle movement occurring on or approaching the runway surfaces 12L and 12R. Optionally, if suitably networked with a vehicle service system 200 such as a vehicle wheel alignment measurement or inspection system, the vehicle position detection and guidance system 100 may be activated automatically by the vehicle service system at predetermined points during a vehicle service or inspection procedure, such as when a vehicle is being initially positioned on the service lift 10, when a rolling compensation procedure is required during an alignment measurement, or when the vehicle is being removed from the service lift 10.

In a further embodiment, the LiDAR sensor 102 of the vehicle position detection and guidance system 100 is configured with a field of view sufficient to additionally observe leading edges of the vehicle V and the vehicle undercarriage surfaces as the vehicle V approaches and is driven onto the automotive service lift runways 12L, 12R. By evaluating the spatial position of the vehicle leading edge and/or undercarriage surfaces observed by the LiDAR sensor 102, the processing system 106 is configured to determine if the vehicle V will encounter any obstructions either on the visible surfaces of the lift runways 12L, 12R, or in the volume of space between the runways, and provide a suitable visual or audible warning to the service technician. Potential obstructions may include, but are not limited to, tools left on the runway surfaces 12L, 12R, wheel chocks left on the runway surfaces 12L, 12R, service technicians standing in front of the vehicle, and jack components 17 (front, rear) supported between the runway surfaces 12L, 12R which are not properly stowed in a storage position over which the vehicle V can travel. Similarly, if the approaching vehicle V has low ground clearance body components, such as a front air splitter, side skirts, or a front air dam visible to the LiDAR sensor 102 which will not clear an approach ramp or edge located at the approach end of the lift runways 12L, 12R, a suitable visual or audible warning is provided to the service technician by the processing system 106 prior to any potentially damaging impact.

Figure 5:
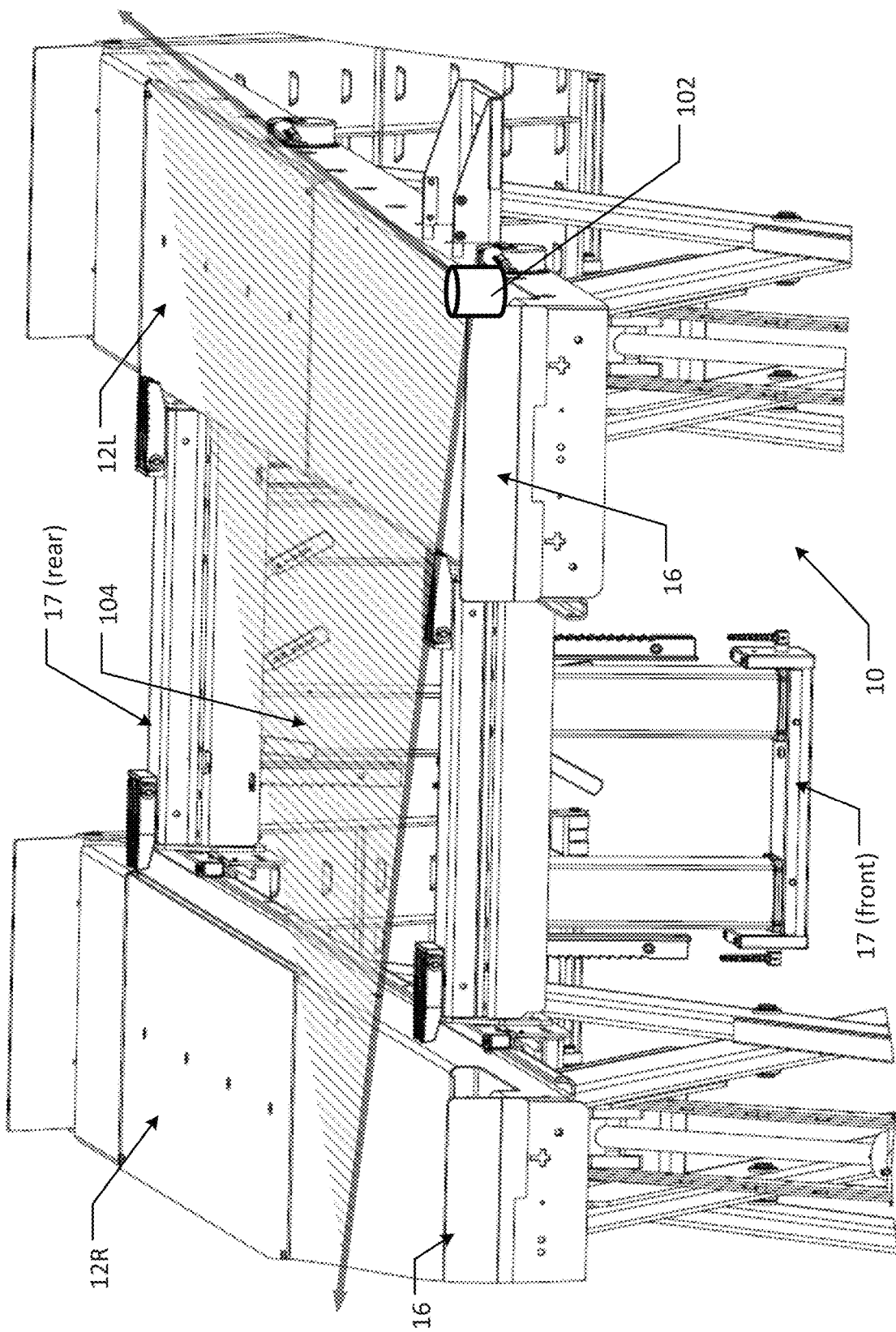
FIG. 5 is a perspective view of a set of lowered, but not stowed, jacks disposed between the runways of a vehicle lift rack, and the relationship with a portion of the sensor system field of view.
Figure 6:
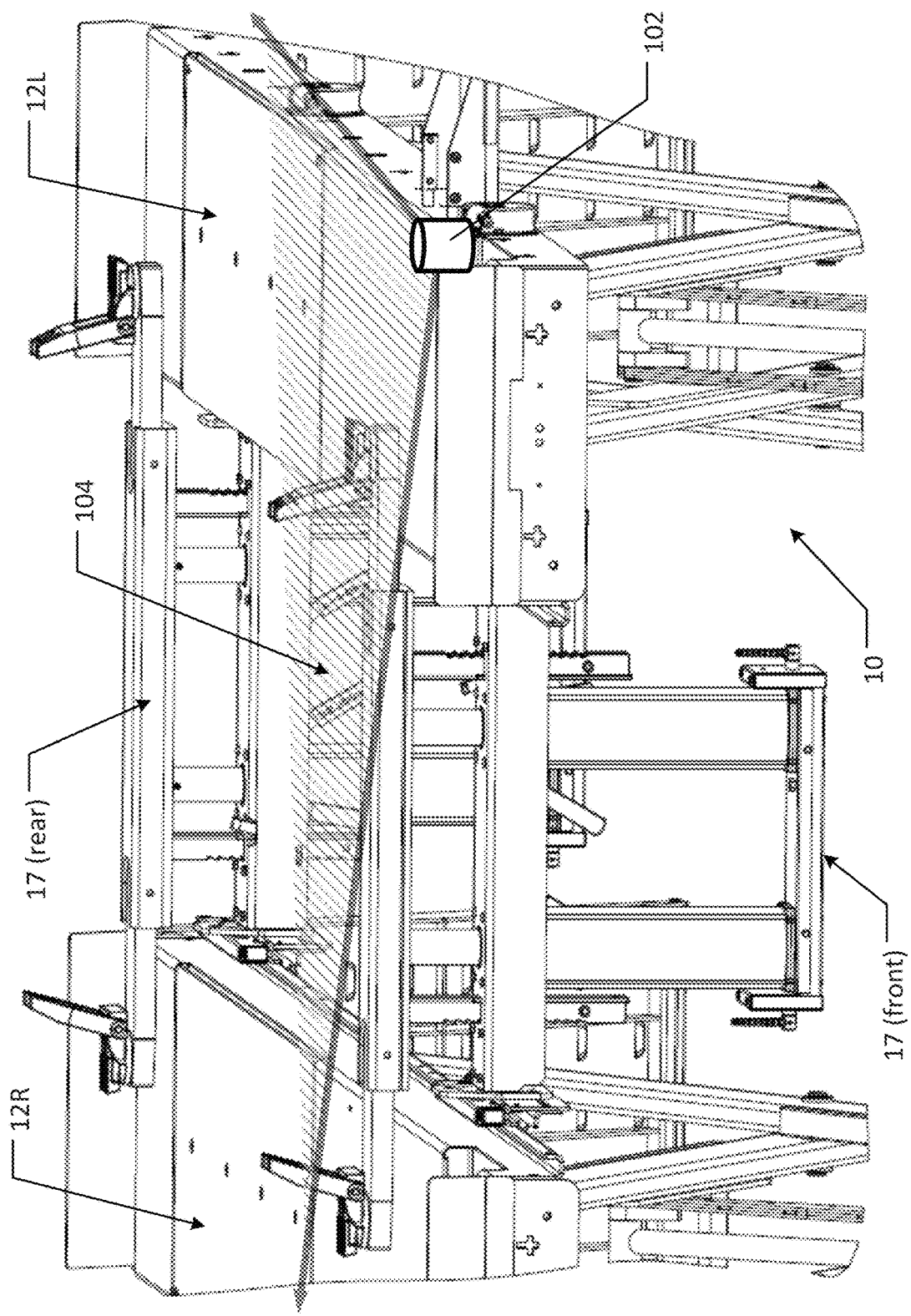
FIG. 6 is a perspective view of a jack in an elevated position partially supporting a vehicle above a lift rack, illustrating how a general field of view for a sensor system shown in FIG. 5 intersect the vehicle wheels and elevated jack components.

In an additional embodiment, the LiDAR sensor 102 of the vehicle position detection and guidance system 100 is configured to monitor the volume of space located beneath the vehicle V and between the lift runways 12L, 12R before and during any operation which alters the height of the automotive service lift structure 10. If the processing system 106 detects the presence of any obstructions, such as improperly stowed lift jacks 17 (front, rear) as shown in FIG. 5, elevated lift jacks (front, rear) as shown in FIG. 6, or the presence of a service technician under the vehicle V, within the observed volume, movement of the lift structure 10 is automatically prevented or immediately terminated, and a suitable audible or visual warning provided to the service technician.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. An improved automotive service lift system having a structure supporting a pair of runways and an elevating mechanism for altering an elevation of said pair of runways, the improvement comprising:

a LiDAR sensor secured in a fixed position relative to, and movable with, said pair of runways, said LiDAR sensor having a field of view encompassing at least a planar region above a portion of an upper surface of each of said runways in said pair, together with an intervening region between said runways; and a processor configured with software instructions to receive spatial data from said LiDAR sensor, and to evaluate said received spatial data to identify, for a vehicle approaching, or disposed on, said runways, a position of two or more wheels of said vehicle relative to said pair of runways.

2. The improved automotive service lift system of claim 1 wherein said processor is further configured to generate output representative of guidance instructions to an operator positioning or moving said vehicle onto or along said pair of runways.

3. The improved automotive service lift system of claim 2 wherein said guidance instructions are audible to said operator.

4. The improved automotive service lift system of claim 2 wherein said guidance instructions include visible indicia presented on a display device.

5. The improved automotive service lift system of claim 1 wherein said processor is further configured with software instructions to evaluate said received spatial data to identify a presence of an obstruction in a movement path of said vehicle onto or along said pair of runways; and
wherein said processor is configured with software instructions to generate output representative of a warning in response to an identified obstruction in said movement path.

6. The improved automotive service lift system of claim 1 wherein said processor is further configured with software instructions to evaluate said received spatial data to detect a presence of an obstruction to vertical movement of at least one of said support structure, said pair of runways, said elevating mechanism, or said vehicle disposed on said pair of runways; and
wherein said processor is configured with software instructions to generate output representative of a warning in response to detection of an obstruction to said vertical movement.

7. The improved automotive service lift system of claim 1 wherein said field of view is a three-dimensional volume intersecting at least a portion of an underside surface of said vehicle positioned on said pair of runways.

8. A method for monitoring movement associated with an automotive service lift system for vertically elevating a vehicle driven onto a pair of runways from an approach end towards a front end, comprising:
observing from a vantage point adjacent to, and fixed relative to, said pair of runways, a single sensor field of view which encompasses at least a planar region extending laterally across and above an upper surface of each runway in said pair of runways;
detecting, within said single sensor field of view, a position of at least one vehicle wheel on each of said runways;
monitoring movement of each of said detected vehicle wheels within said single field of view relative to said associated runway upper surfaces; and
responsive to said monitored movement, generating guidance output to a service technician for steering, moving, or stopping said vehicle on said pair of runways.

9. The method of claim 8 further including the step of detecting, within said field of view, an obstruction to vehicle movement on at least one of said upper surfaces of said pair of runways; and
wherein said step of generating guidance output is further responsive to a detection of said obstruction to generate a warning output to said service technician.

10. The method of claim 8 further including the step of detecting, within said field of view, an obstruction to vertical movement of said pair of runways or said vehicle on said pair of runways; and
wherein said step of generating guidance output is further responsive to a detection of said obstruction to generate a warning output to said service technician.

11. The method of claim 10 wherein said step of generating guidance output is further responsive to said detection of said obstruction to generate a command signal preventing said vertical movement of said pair of runways.

12. The method of claim 10 wherein said step of observing is responsive to an initiation of vertical movement of said pair of runways.

13. The method of claim 8 wherein said step of observing is automatically triggered by a step in a computer-implemented vehicle service or inspection procedure.

14. A method for providing guidance to a vehicle operator while moving a vehicle on a vehicle support structure, comprising:
detecting positions of two or more wheels of the vehicle within a field of view of a single sensor, said field of view encompassing at least a planar region extending laterally across and above at least a portion of an upper surface of the vehicle support structure;
monitoring movement of said two or more wheels within said field of view relative to said upper surface of said vehicle support structure; and
responsive to said monitored movement, generating guidance output to the vehicle operator for steering, moving, or stopping said vehicle relative to said upper surface of said vehicle support structure.

15. The method of claim 14 wherein said step of detecting includes observing said field of view with a LiDAR sensor, said LiDAR sensor generating spatial data which is output representative of observed objects within said field of view; and
evaluating said spatial data from said LiDAR sensor to monitor a position on, and movement of, said two or more wheels relative to said upper surface of the vehicle support structure.

16. The method of claim 15 wherein said vehicle support structure is a vertically movable vehicle lift system including a pair of parallel runways for supporting the wheels on each side of a vehicle during a vehicle service or inspection procedure; and
wherein said step of evaluating said spatial data from said LiDAR sensor further includes detecting a presence of objects within said field of view presenting obstacles to movement of said vehicle.

17. The method of claim 16 wherein said step of evaluating said spatial data from said LiDAR sensor further includes detecting a presence of objects within said field of view presenting obstacles to movement of said vehicle support structure.

18. The method of claim 14 wherein said guidance output is audible to said vehicle operator.

19. The method of claim 14 wherein said guidance output is visible to said vehicle operator.

* * * * *